Jan. 11, 1949. H. Z. MARTIN 2,458,866
REMOVING ENTRAINED GASEOUS FLUIDS FROM SOLIDS
Filed Nov. 21, 1944 2 Sheets-Sheet 2

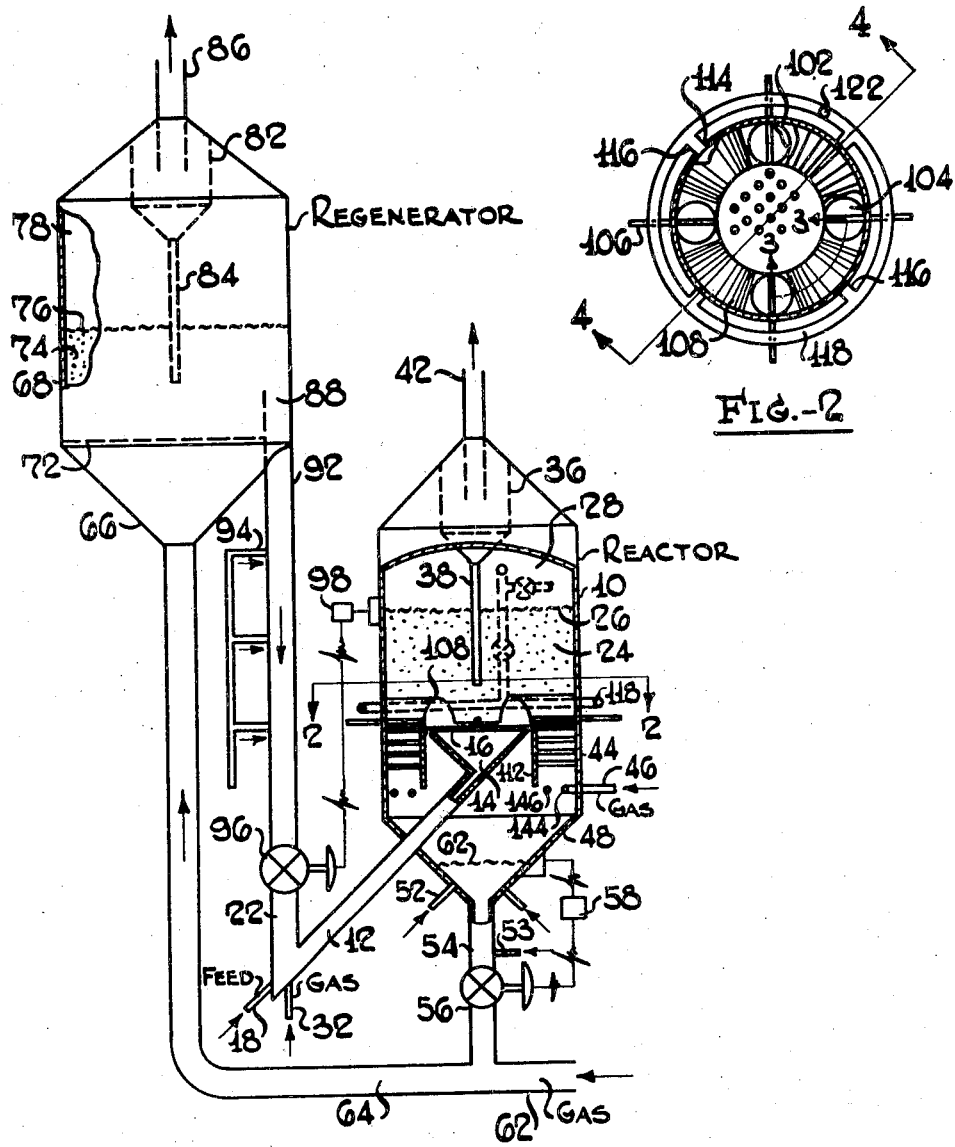

Homer Z. Martin Inventor
By ___ Young Attorney

Patented Jan. 11, 1949

2,458,866

UNITED STATES PATENT OFFICE 2,458,866

REMOVING ENTRAINED GASEOUS FLUIDS FROM SOLIDS

Homer Z. Martin, Roselle, N. J., assignor to Standard Oil Development Company, a corporation of Delaware Application November 21, 1944, Serial No. 564,515

8 Claims. (Cl. 23—288)

1

This invention relates to stripping or purging volatile entrained material from solid particles.

In various catalytic processes using powdered catalyst or contact material or catalyst or contact material in divided form, volatile material is entrained with the particles removed from the reaction vessel or zone. For example, in the catalytic cracking of hydrocarbons, coke or hydrogen-containing carbonaceous material is deposited on the catalyst or contact particles and the particles are usually removed from the reaction zone and passed to a regeneration zone where they are regenerated.

In removing catalyst or contact particles from the reaction zone, volatile hydrocarbons are entrained with the particles, and if the volatile material is not substantially all removed from the particles, it is lost from the system by being burned in the regeneration zone. Also, in such cases, an additional load is placed on the regeneration zone as more combustible material must be burned.

In the newer type unit for catalytic cracking, the solid particles are maintained as a dense dry fluidized liquid-simulating mixture in the lower portion of the reaction zone with a dilute phase thereabove. In these newer units greater quantities of catalyst are circulated to and from the reaction zone since all the heat for preheating, vaporizing and cracking the oil is transferred by direct contact of hot regenerated catalyst with the relatively cold oil feed. Poor stripping is therefore reflected in greater product loss and greater carbon or coke formation than in the older type units not using liquid feed. In the new type units the spent or fouled catalyst or contact particles are removed as a dense fluidized dry liquid-simulating mixture and the stripping step usually used is not as efficient as is desired.

In the older type units the stripping was done in the dilute phase. The essential difference between the dilute and the dense bed stripping sections is that in the dilute phase stripping the gas phase predominates in the stripping section whereas in the dense bed stripping step the catalyst phase occupies the greater part of the volume of the stripping section. The same net quantity of catalyst or contact particles passes through either type of stripper but in the case of the dilute phase stripping, some throttling mechanism is usually provided in the catalyst entrance point so that the catalyst particles cannot completely fill the stripping section. The solid particles then fall through a stream of slowly rising gases and in this way are effectively stripped of whatever hydrocarbon materials they bring into the stripping section.

According to this invention, dense phase fluidized spent or fouled catalyst is removed from the lower part of a reaction zone and passed through a stripping section as a dilute phase mixture or as a mixture in which there is only a small amount of particles suspended in the stripping gas. With my invention better stripping is obtained and less steam or other stripping gas is required than with the dense phase stripping operation.

The material stripped out is returned to the dilute phase in the reaction zone and thus bypasses the dense bed permitting more effective use of the reaction zone or use of a smaller reaction zone. Or the material stripped out may be passed to other separating equipment to reduce the load on the separating equipment associated with the reaction zone.

In the drawings:

Fig. 1 represents one form of treating unit embodying my invention;

Fig. 2 represents a horizontal transverse enlarged cross-section taken substantially on line 2—2 of Fig. 1 with parts broken away to facilitate the disclosure;

Figure 3:
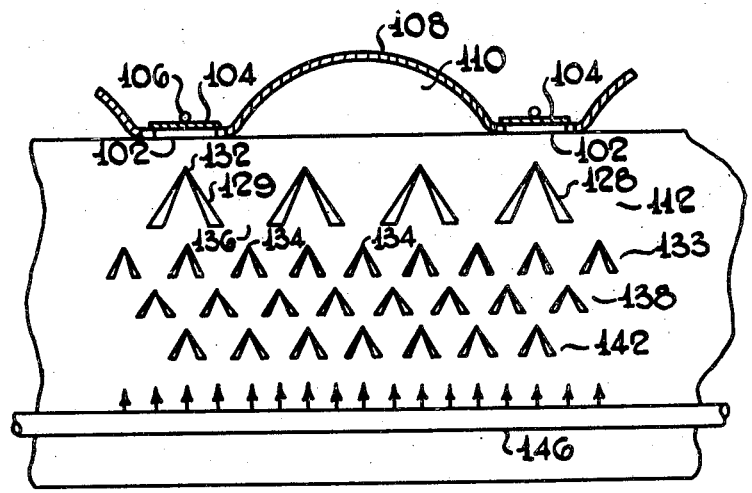
Fig. 3 represents a partial developed sectional view taken substantially on line 3—3 of Fig. 2.
Figure 4:
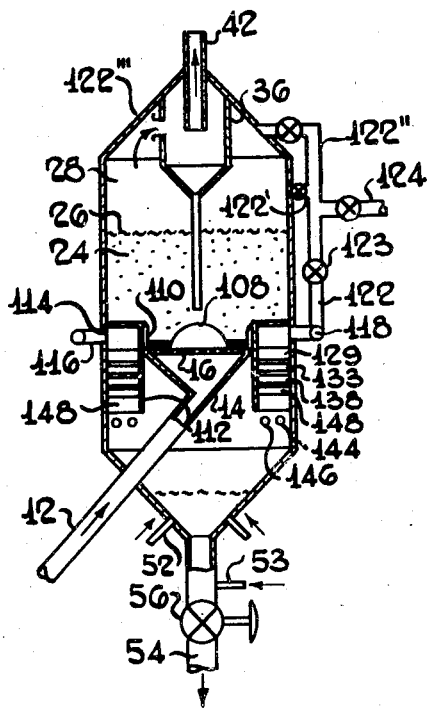
Fig. 4 represents a vertical longitudinal section taken substantially on line 4—4 of Fig. 2.

Referring now to the drawing, the reference character 10 designates a reaction or contact zone provided with a feed inlet pipe 12 which extends into the reaction zone and terminates in a conical member 14 having a horizontally arranged perforated distribution member 16 at its upper end. The conical member 14 is arranged in the lower portion of the reaction zone or vessel 10.

The feed may be vaporized, preheated liquid or a mixture of vapors and liquid. When using preheated liquid or a mixture of vapors and liquid, hot regenerated catalyst is used in sufficient amount to vaporize all the liquid and raise the liquid or vapors to reaction temperature. When using vapors as the feed, the vapors and hot regenerated catalyst are mixed and introduced into the reaction zone or vessel 10.

The feed is introduced into line 12 through line 18 and hot regenerated catalyst or contact particles are introduced from line 22. The mixture is passed through line 12 and distribution member 16 is through the reaction zone 10, the distribution member 16 acting to evenly distribute the solid particles across the area of the reaction zone. If desired, the feed and catalytic or contact material may be separately introduced into the reaction zone.

When hydrocarbons are to be catalytically cracked, the catalyst is any suitable cracking catalyst, such as acid-treated bentonite clay, silica alumina gel, or silica magnesia gels, etc., having a size between about 200 and 400 standard mesh. Most of the catalyst passes through 100 standard mesh and the catalyst contains up to 10% of 0 to 20 microns. Larger catalyst particles may be used, if desired. Other catalytic material is used when other hydrocarbon treating operations are used, such as catalytic reforming, etc. When catalytic treatment of other materials is used, suitable catalysts are selected.

The velocity of the vapors or gases passing upwardly through the reaction zone or vessel 10 is selected to form a dense fluidized dry liquid-simulating mixture 24 having a level 26 with a dilute phase or dilute suspension 28 above the dense phase. The dense mixture 24 is maintained in a highly turbulent and agitated condition to insure intimate contact between the gaseous fluid and the contact particles. Using acid-treated bentonite clay in powdered form and with a velocity between about ½ ft./second and 1½ ft./second, the density of the fluidized mixture is between about 12 lbs./cu. ft. and 30 lbs./cu. ft. The temperatures during the cracking operation may vary between about 700° F. and 1100° F. Pressures are usually about atmospheric but higher pressures may be used if desired.

Gas, such as steam, may be introduced into line 12 through line 32 for admixture with the feed and the hot regenerated catalyst. The vapors or gaseous fluid passing upwardly through the reaction zone remains in the reaction zone for a sufficient period of time to effect the desired extent of reaction or conversion. The gaseous reaction products pass upwardly into the upper part of the reaction zone or vessel 10 and some catalyst or contact particles settle out and some are entrained in the reaction products into the dilute phase 28.

The gaseous reaction products are passed through a separating means 36 arranged in the upper part of the reaction zone or vessel 10 to remove the entrained catalyst particles from the gaseous reaction products. Separated catalyst is returned to the dense bed 24 by dip pipe 38 which dips below the level 26 of the dense bed mixture 24 in the reaction zone 10. The gaseous reaction products pass overhead through line 42 to a suitable equipment (not shown) to recover desired products. In catalytic cracking the reaction products are passed to a fractionating equipment wherein the desired products are separated and entrained catalyst is recovered by the condensate oil in the bottom portion of the fractionator.

The catalyst or contact particles during the catalytic reaction where organic material is being reacted, such as the catalytic cracking of hydrocarbons, become fouled or spent by the deposition of coke or carbonaceous material and the catalyst particles must be regenerated before being reused in another cracking operation or treating operation. In the type of unit shown in Fig. 1 of the drawing, the spent or fouled catalyst is withdrawn from the bottom portion of the reaction zone in a dense phase or dense dry liquid-simulating condition.

My invention comprises an improved stripping zone or section which will now be only generally described to complete the process and then my improved stripping section or vessel will be more particularly described. The dense phase spent catalyst is passed through an annular stripping zone or section 44 arranged below the level of the distribution plate 16 where the catalyst particles are contacted with a stripping gas, such as steam, introduced into the bottom portion of the stripping zone or section 44 through line 46. The stripping gas flows upwardly countercurrent to the downflowing catalyst particles.

The stripped catalyst or contact particles collect in the conical bottom 48 of the cylindrical reaction vessel 10 and are preferably maintained in a fluidized condition by the introduction of fluidizing or aerating gas at 52. Stripped catalyst or contact particles flow into the spent catalyst standpipe 54 having a control valve 56 for controlling the rate of flow of catalyst from the spent catalyst standpipe 54. A level controller, generally indicated at 58, is provided to maintain the level of stripped catalyst at about the level shown at 62 in the drawing by varying the opening of control valve 56 on the spent catalyst standpipe 54.

The stripped spent catalyst is mixed with a regenerating gas, such as oxygen, oxygen-containing gases, air, etc., introduced through line 62 to form a less dense mixture and the less dense mixture is passed through line 64 into the conical bottom portion 66 of the cylindrical regeneration zone or vessel 68 below perforated distribution plate member 72. The velocity of the regenerating gas is selected to form a dry fluidized liquid-simulating mixture or bed 74 of catalyst particles having a level indicated at 76 with a dilute phase 78 thereabove. The catalyst or contact particles in the fluidized mixture or bed are maintained in an agitated and turbulent condition to insure intimate contact between the regenerating gas and the particles to be regenerated. With this form of mixture, the temperature during regeneration is maintained substantially constant throughout the regeneration step. The upper portion of the regeneration zone or vessel 78 forms a settling zone and some catalyst settles out of the regeneration gases and some is entrained with the regeneration gases leaving the dense bed or mixture 74.

Hot regeneration gases pass into the separating means 82 for separating some entrained catalyst particles from the regeneration gases. The separating means 82 is arranged in the upper portion of the regeneration vessel 68. Separated catalyst is returned to the dense bed or mixture 74 by dip pipe 84 which extends below the level 76 in the regeneration zone 68. Hot regeneration gases pass overhead through line 86. Additional separating means may be used, such as cyclone separators, scrubbers, electrical precipitators, etc. The temperature during regeneration is about 1000° F. to 1150° F. and before passing the regeneration gases to the electrical precipitator, it is desirable to cool the gases to about 300° F. to 400° F. The heat in the regeneration gases may be recovered by passing the regeneration gases through a heat exchange equipment such as a waste heat boiler.

Hot regenerated catalyst at a temperature of about 1000° F. to 1150° F. is withdrawn in a dense fluidized condition from the lower portion of the dense bed 74 through withdrawal pipe 88 which extends above the distribution plate member 72. Pipe 88 forms the upper part of regenerated catalyst standpipe 92 which receives the hot regenerated catalyst from the pipe 88 and which feeds the regenerated catalyst to lines 22 and 12 leading to the reaction zone or vessel 10. Fluidizing lines 94 are provided for the regenerated catalyst standpipe 92 for maintaining the catalyst particles in a dense fluidized liquid-like condition in the standpipe to produce a sufficient hydrostatic pressure at the bottom of the standpipe to return the regenerated catalyst particles to the reaction zone or vessel 10.

Standpipe 92 is provided with a control valve 96 at its lower portion for controlling the rate of withdrawal or flow of regenerated catalyst particles from the standpipe. Control mechanism generally indicated at 98 is provided for maintaining the level 26 substantially constant. The control mechanism is associated with control valve 96 and changes in the level 26 actuate the control mechanism to vary the opening in valve 96 to control the flow of catalyst from the standpipe 92 to maintain the level 26 in the reaction zone substantially constant.

My improved stripping section or vessel will now be described. The entrance to the stripping section 44 is providing with ports or openings 102 controlled by valves 104. The valves are provided with actuating means 106 which extend outside reaction vessel 10 for varying the size of the ports or openings 102. While I have shown four ports and four valves, it is to be understood that the number of openings in the valve may be varied.

The valves may be manually or automatically controlled and may be individually operated or operated as a unit. The valves may be butterfly or pivoted valves, plug valves, slide valves, or other suitable types of valves.

Curved arcuate baffles 108 are provided between ports 102. As shown in Fig. 3, these baffles are preferably curved or arched upwardly from the ports to prevent catalyst build up at the ports 102 or at the entrance to the stripping zone 44. The baffles 108 may take other shapes as inverted V shapes in cross section, the shape being selected to prevent build-up of catalyst or packing of the catalyst particles adjacent the ports 102.

The outer edge of each baffle is sealed to the interior of the wall of the reaction zone 10 and the inner edge of each baffle has a vertical wall 110 which forms a continuation of skirt 112 which depends from the upper portion of the conical inlet 14. In this way the stripping zone is sealed off so that the only openings to the striping zone 44 are the ports 102. The stripping zone 44 is formed between the inner wall of the vessel 10 and the skirt 112 so that an annular stripping zone or section is provided.

Stripping gas and volatile material stripped out of the mixture collect in the upper portion of the stripping section or zone 44 under each curved baffle 108 and are withdrawn through openings 114 passing through the wall of vessel 10. The openings 114 communicate with pipes 116 leading to a circular manifold 118 exterior to the reaction vessel 10. The stream of stripping gas and volatile material from manifold 118 is passed through vertical line 122 and in this way is by-passed around the dense bed or mixture 24 in the reaction vessel 10 and is injected into the dilute phase 28 through valved line 122' or into the upper conical space of the reaction vessel through valved line 122'' which opens through the top conical portion 122''' of the reaction vessel. In some cases it may be preferred to introduce the gaseous fluid from line 122 into the upper conical space to avoid changing the velocity in the dilute phase 28 directly above the bed 24.

The stream of stripping gas and volatile material is introduced upstream of the separating means 36 so that entrained catalyst or contact particles are removed in passing out of the reaction vessel through the separating means 36. A valve 123 is provided for line 122 and is used as a control means as will be hereinafter described in greater detail. The line 122 is provided with a valved line 124 for removing stripping gas and volatile material from the system when it is not desired to return the stripping gas and volatile material to the reaction zone or vessel 10.

Providing the by-pass line 122 is an improvement over other forms of strippers because the stripping gas and the stripped out material does not have to pass up through the dense bed or mixture in the reaction zone or vessel 10. Using the by-pass line 122 in the design of new plants, it becomes unnecessary to allow for the volume of stripping gases when designing the reaction vessel and a considerable decrease in the diameter of the reaction vessel is thus effected. Furthermore, in applying my invention to existing plants, a considerable increase in capacity is possible by providing the by-pass line 122 for by-passing the stripping gases around the dense bed.

The stripping zone or section 44 is provided with rows of radial baffles arranged one above the other. Each baffle is of inverted V shape in cross-section. The top row 128 of baffles 129 is preferably formed of larger baffles than the remaining rows. The baffles in the top row are arranged to have the apex 132 of certain of the baffles directly below ports 102. The dense phase catalyst from the reaction vessel 10 is divided by the sloping sides of the baffles 129 into two streams flowing down in opposite directions.

The next lower row of baffles 133 is arranged to have the apex 134 of every other baffle directly below the opening 136 between the adjacent lower ends of the baffles of the top row 128. The next two rows of baffles 138 and 142 are also arranged in offset or staggered relation so that the apexes of the baffles are beneath openings between the bottoms of the sloping sides of the baffles of the next higher row to further subdivide the down-flowing streams of solid particles.

Stripping gas, such as steam, flue gas, or inert gas, is introduced into the bottom portion of the stripping section or zone 44 through line 46 and concentric circular distribution pipes 144 and 146 provided with openings in the top portions thereof. The velocity of the gas rising between adjacent baffles, that is, at the points of minimum cross-section, may range from ½ ft./second or less to about 1.5 ft./second. The valves 104 associated with the ports 102 may be manually operated to select the desired rate of flow of spent catalyst from the reaction zone or vessel 10 into the stripping section 44 or they may be automatically controlled. The amount of catalyst passing to the stripper is controlled so that the particles do not fill the stripping sections and therefore the stripping is carried out in the dilute phase.

The opening 114 for the removal of stripping gas from the upper portion of the stripping section is located between two of the ports 102 and as high up as possible in order to minimize the carry-over of catalyst from the stripping section into the reaction zone 10.

The stripping medium may be steam or any other suitable inert gas. Air may also be used if proper precautions are taken to minimize the flow of this gas during upset conditions. If air is used as a stripping medium, it will burn some of the carbon on the catalyst particles in the lower portion of the stripping section and in this way produce inert flue gas which is very suitable for removing hydrocarbon gases or volatile material in the upper portion of the stripping section from the catalyst or contact particles introduced at that point.

Where an inert gas is used for stripping it may be desirable to remove the stripping gas from the top of the stripping section to recovery means other than the separating means 36 shown in the upper portion of the reaction vessel 10. The reason for this is that in some of the existing plants the facilities are limited and the inert gas leaving the top of the stripping section, if passed to the regular outlet 42 of the reaction zone, would cause considerable overloading of the equipment. However, in most instances this will not be the case because only a very small amount of stripping gas is needed for stripping catalyst in my improved stripping vessel.

As above pointed out, the level 26 of the dense material or bed 24 is automatically controlled in the reaction vessel 10 and the level of the stripped catalyst or contact particles collecting in the conical bottom 48 of the reaction vessel 10 is automatically controlled, it only becomes necessary to set the catalyst circulation rate. This may be done conveniently by using the valve 123 in by-pass line 122 which conveys the stripping gas from the top of the stripping section to the top of the reactor 10. This valve may be a rather loose fitting butterfly valve.

The stripping gas rate is set at some constant desired value so that by throttling the valve 123 in by-pass line 122 the pressure on the stripping section 44 is raised slightly and in this way the pressure differential between the reaction vessel 10 and the stripping section 44 is decreased somewhat which in turn decreases the flow of catalyst from the reaction vessel 10 to the stripping section 44. Opening the by-pass valve 123 has the opposite effect, that is, the pressure differential between the reactor and the stripping section 44 is increased and this increases the rate of flow of catalyst from the reaction vessel 10 to the stripping section 44. The valve 123 may be manually or automatically controlled.

If desired, the butterfly valve 123 may be used to adjust the temperature of the dense mixture or bed in the reaction zone or vessel 10. In case the temperature in the reaction vessel 10 falls below a desired value, the valve 123 would be operated to open slightly to bring about an increase in catalyst flow from the hot regenerated standpipe 92 to the reaction vessel 10. On the other hand, if the reactor temperature becomes higher than the desired temperature, the butterfly valve would be closed slightly to decrease the amount of hot regenerated catalyst being delivered to the reaction vessel from the regenerated catalyst standpipe 92.

The temperature during stripping is substantially that used in the cracking operation which may be about 800° F. to 1000° F. The density of the dilute phase or light suspension during stripping is less than about 5 lbs./cu. ft., preferably less than about 1 lb./cu. ft.

A test on a dilute phase stripper showed the following data in comparison with data from a dense phase stripper:

|  | Dilute Phase | | | | Dense Phase |
|---|---|---|---|---|---|
| Spent Cat. rate Tons/Min | 10.9 | 11.6 | 9.05 | 1102 | 14.9 |
| Stripping steam rate, #/Hr | 1040 | 1410 | 2572 | 3780 | 5115 |
| Pounds of equivalent hydrogen plus carbon per ton of cat. leaving the stripper in gaseous phase | 2.82 | 2.03 | 0.80 | 0.38 | 2.94 |
| # Stripping steam/Ton Cat. flowing | 1.59 | 2.02 | 4.74 | 5.63 | 5.72 |

From these data, obtained in an upflow type fluid cracking plant, it is apparent that the pounds of combustibles associated with a ton of stripped catalyst are approximately equal (2.82 vs. 2.94) for the two types of strippers but that the dilute phase stripper used less steam per ton of catalyst circulation (1.59 vs. 5.72). Also, when the comparison is made at approximately equal steam rates per ton of catalyst (5.63 vs. 5.72), the dilute phase stripper produced a catalyst of much less combustible content in the gas phase associated with the solid particles (0.38 vs. 2.94).

While I have shown one form of apparatus and have given certain operating conditions, it is to be understood that these are by way of illustration only and various changes and modifications may be made without departing from the spirit of my invention.

What is claimed is:

1. An apparatus of the character described including a cylindrical vessel having a top outlet for reaction products, a conical feed member therein having a horizontally arranged perforated plate arranged in the lower portion of said vessel providing a reaction chamber above said plate, a skirt depending from said feed member and forming with the internal wall of said vessel an annular stripping section, rows of baffles in said stripping section, means for introducing stripping gas below said baffles, said vessel having a conical bottom for collecting stripped solid material leaving said stripping section and a bottom outlet for solid materials, partition means arranged between the top of said skirt and the internal wall of said vessel, valved openings in said partition means for controlling the flow of solid particles from said reaction zone to said stripping section and means for withdrawing gaseous fluid from the upper portion of said stripping section and from beneath said partition means.

2. An apparatus of the character described including a cylindrical vessel having a top outlet for reaction products, a conical feed member therein having a horizontally arranged perforated plate arranged in the lower portion of said vessel, said vessel providing a reaction chamber above said plate adapted to hold a dense fluidized mixture of solid particles having a level with a dilute phase thereabove, means for maintaining the level substantially constant, a skirt depending from said feed member and forming with the internal wall of said vessel an annular stripping section, rows of baffles in said stripping section, means for introducing stripping gas below said baffles, said vessel having a conical bottom for collecting stripped solid material leaving said stripping section and a bottom outlet for solid material and partition means arranged between the top of said skirt and the internal wall of said vessel, valved openings in said partition means for controlling the flow of solid particles from said reaction chamber to said stripping section, a line for withdrawing stripping gas from the upper part of said stripping section and introducing it into the dilute phase in said reaction chamber, a valve in said last mentioned line for controlling the rate of removal of stripping gas from said stripping section to vary the pressure in said stripping section whereby the rate of flow of solid particles from said reaction chamber to said stripping section may be varied.

3. An apparatus of the character described including a cylindrical vessel having a top outlet for reaction products, a conical feed member therein having a horizontally arranged perforated plate arranged in the lower portion of said vessel providing a reaction chamber above said plate, a skirt depending from said feed member and forming with the internal wall of said vessel an annular stripping section, rows of baffles in said stripping section, means for introducing stripping gas below said baffles, said vessel having a conical bottom for collecting stripped solid material leaving said stripping section and a bottom outlet for solid material, partition means arranged between the top of said skirt and the internal wall of said vessel, a plurality of valved openings around said partition means for controlling the flow of solid particles from the reaction chamber to the stripping section, the sections between said valves being arched to prevent accumulation and build-up of solid particles thereon when solid material is passed from said reaction chamber to said stripping section and means for withdrawing gaseous fluid from the upper portion of said stripping section.

4. An apparatus of the character described including a cylindrical vessel having a top outlet for reaction products, a conical feed member therein having a horizontally arranged perforated plate arranged in the lower portion of said vessel providing a reaction chamber above said plate, a skirt depending from said feed member and forming with the internal wall of said vessel an annular stripping section, rows of baffles in said stripping section, means for introducing stripping gas below said baffles, said vessel having a conical bottom for collecting stripped solid material leaving said stripping section and a bottom outlet for solid material, partition means arranged between the top of said skirt and the internal wall of said vessel, a plurality of valved openings around said partition means for controlling the flow of solid particles from the reaction chamber to the stripping section, the sections between said valves being arched to prevent accumulation and build-up of solid particles thereon when solid material is passed from said reaction chamber to said stripping section and means for withdrawing gaseous fluid from the upper portion of said stripping section, said means for withdrawing gaseous fluid from the upper portion of said stripping section including a plurality of outlets, one outlet being associated with the underside of each arched portion for removing gaseous fluid from said stripping section.

5. An apparatus of the character described including a cylindrical vessel having a top outlet for reaction products, a conical feed member therein having a horizontally arranged perforated plate arranged in the lower portion of said vessel, said vessel providing a reaction chamber above said plate adapted to hold a dense fluidized mixture of solid particles having a level with a dilute phase thereabove, means for maintaining the level substantially constant, a skirt depending from said feed member and forming with the internal wall of said vessel an annular stripping section, rows of baffles in said stripping section, means for introducing stripping gas below said baffles, said vessel having a conical bottom for collecting stripped solid material leaving said stripping section and a bottom outlet for solid material and partition means arranged between the top of said skirt and the internal wall of said vessel, valved openings in said partition means for controlling the flow of solid particles from said reaction chamber to said stripping section, a line for withdrawing stripping gas from the upper part of said stripping section and introducing it into the dilute phase in said reaction chamber, a valve in said last mentioned line for controlling the rate of removal of stripping gas from said stripping section to vary the pressure in said stripping section whereby the rate of flow of solid particles from said reaction chamber to said stripping section may be varied, and means for maintaining a level of stripped contact particles in the conical bottom of said vessel substantially constant.

6. An apparatus of the character described including a cylindrical vessel having a top outlet for reaction products, a conical feed member therein having a horizontally arranged perforated plate arranged in the lower portion of said vessel providing a reaction chamber above said plate, a skirt depending from said feed member and forming with the internal wall of said vessel an annular stripping section, rows of baffles in said stripping section, means for introducing stripping gas below said baffles, said vessel having a conical bottom for collecting stripped solid material leaving said stripping section and a bottom outlet for solid material, partition means arranged between the top of said skirt and the internal wall of said vessel, a plurality of valved openings around said partition means for controlling the flow of solid particles from the reaction chamber to the stripping section, the sections between said valves being arched to prevent accumulation and build-up of solid particles thereon when solid material is passed from said reaction chamber to said stripping section and means for withdrawing gaseous fluid from the upper portion of said stripping section, said means for withdrawing gaseous fluid from the upper portion of said stripping section including a plurality of outlets, one outlet being associated with the underside of each arched portion for removing gaseous fluid from said stripping section, a line communicating with the upper portion of said vessel, said outlets being in communication with said line to conduct gaseous fluid from said stripping section to said vessel.

7. An apparatus of the character described including a cylindrical vessel having a top outlet for reaction products, a conical feed member therein having a horizontally arranged perforated plate arranged in the lower portion of said vessel providing a reaction chamber above said plate, a skirt depending from said feed member and forming with the internal wall of said vessel an annular stripping section, means for introducing stripping gas into the lower portion of said stripping section, said vessel having a conical bottom for collecting stripped solid material leaving said stripping section and a bottom outlet for solid material, partition means arranged between the top of said skirt and the internal wall of said vessel, valved openings in said partition means for controlling the flow of solid particles from said reaction zone to said stripping section and means for withdrawing stripping gas and stripped-out material from the upper portion of said stripping section.

8. An apparatus of the character described including a cylindrical vessel having a top outlet for reaction products, a conical feed member therein having a horizontally arranged perforated plate arranged in the lower portion of said vessel providing a reaction chamber above said plate, a skirt depending from said feed member and forming with the internal wall of said vessel an annular stripping section, means for introducing stripping gas into the lower portion of said stripping section, said vessel having a conical bottom for collecting stripped solid material leaving said stripping section and a bottom outlet for solid material, partition means arranged between the top of said skirt and the internal wall of said vessel, a plurality of valved openings around said partition means, the sections between said valved openings being arched to prevent accumulation of solid particles thereon when solid material is passed from said reaction chamber to said stripping section and means for withdrawing stripping gas and stripped-out material from the upper portion of said stripping section.

HOMER Z. MARTIN.

REFERENCES CITED

The following references are of record in the file of this patent:

UNITED STATES PATENTS

| Number | Name | Date |
|---|---|---|
| 2,326,705 | Thiele et al. | Aug. 10, 1943 |
| 2,341,193 | Scheineman | Feb. 8, 1944 |
| 2,363,874 | Krebs | Nov. 28, 1944 |
| 2,391,336 | Ogorzaly | Dec. 18, 1945 |
| 2,414,852 | Burnside et al. | Jan. 28, 1947 |
| 2,422,793 | McAfee | June 24, 1947 |